United States Patent
Zhang et al.

(10) Patent No.: US 10,924,421 B2
(45) Date of Patent: Feb. 16, 2021

(54) PACKET TRANSMISSION METHOD, TERMINAL, NETWORK DEVICE, AND COMMUNICATIONS SYSTEM

(71) Applicant: HUAWEI TECHNOLOGIES CO., LTD., Guangdong (CN)

(72) Inventors: Zhong Zhang, Shenzhen (CN); Yu Deng, Shenzhen (CN); Neng Yang, Shenzhen (CN); Jianguo Wei, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/454,947

(22) Filed: Jun. 27, 2019

(65) Prior Publication Data

US 2019/0319889 A1 Oct. 17, 2019

Related U.S. Application Data

(63) Continuation of application No. PCT/CN2017/116601, filed on Dec. 15, 2017.

(30) Foreign Application Priority Data

Dec. 30, 2016 (CN) .......................... 2016 1 1260835

(51) Int. Cl.
*H04L 12/807* (2013.01)
*H04L 12/26* (2006.01)
(Continued)

(52) U.S. Cl.
CPC .............. *H04L 47/27* (2013.01); *H04L 43/16* (2013.01); *H04L 47/34* (2013.01); *H04W 28/06* (2013.01)

(58) Field of Classification Search
CPC ....... H04L 47/27; H04L 47/34; H04L 47/263; H04L 47/37; H04L 43/16
See application file for complete search history.

(56) References Cited

U.S. PATENT DOCUMENTS 7,912,060 B1 * 3/2011 Chen .................. H04L 47/27
370/229
9,049,015 B2 6/2015 Tavares et al.
(Continued)

FOREIGN PATENT DOCUMENTS

CN 1520104 A 8/2004
CN 101047485 A 10/2007
(Continued)

OTHER PUBLICATIONS

M. Mathis et al. TCP Selective Acknowledgment Options, RFC 2018, Oct. 1996. pp. 1-12.

*Primary Examiner* — Min Jung
(74) *Attorney, Agent, or Firm* — Womble Bond Dickinson (US) LLP

(57) ABSTRACT

A packet transmission method and related apparatus are disclosed. A transmit end retransmits a first packet to a receive end and decreases a congestion window and a slow start threshold upon determining that the first packet has been lost. The receive end sends an ACK in response to the retransmitted first packet to the transmit end on receipt of the retransmitted first packet for the first time, where the ACK contains a proactively constructed DSACK option for informing the transmit end that the first packet has been received repeatedly. The transmit end therefore compensates the congestion window and/or the slow start threshold.

16 Claims, 15 Drawing Sheets

(51) Int. Cl.
    *H04L 12/801*     (2013.01)
    *H04W 28/06*     (2009.01)

(56) References Cited

U.S. PATENT DOCUMENTS

| | | | |
|---|---|---|---|
| 9,178,789 B2* | 11/2015 | Zhang | H04L 43/0882 |
| 2004/0062267 A1* | 4/2004 | Minami | H04L 47/10 370/463 |
| 2007/0230337 A1 | 10/2007 | Igarashi et al. | |
| 2012/0163385 A1 | 6/2012 | Lee et al. | |
| 2014/0185452 A1 | 7/2014 | Kakadia et al. | |
| 2016/0285594 A1* | 9/2016 | Chen | H04L 1/1607 |
| 2018/0212721 A1* | 7/2018 | Zhang | H04L 1/1809 |

FOREIGN PATENT DOCUMENTS

| | | |
|---|---|---|
| CN | 100382478 C | 4/2008 |
| CN | 104125159 A | 10/2014 |
| EP | 1180869 B1 | 10/2005 |
| EP | 1841118 A2 | 10/2007 |
| WO | 2014138536 A2 | 9/2014 |
| WO | 2016201904 A1 | 12/2016 |

\* cited by examiner

|   Kind = 5   |   Length   |
| --- | --- |
| Left edge of 1st Block ||
| Right edge of 1st Block ||
| ... ||
| Left edge of nth Block ||
| Right edge of nth Block ||

FIG. 8

PACKET TRANSMISSION METHOD, TERMINAL, NETWORK DEVICE, AND COMMUNICATIONS SYSTEM

CROSS-REFERENCE TO RELATED APPLICATIONS

This application is a continuation of International Application No. PCT/CN2017/116601, filed on Dec. 15, 2017, which claims priority to Chinese Patent Application No. 201611260835.6 filed on Dec. 30, 2016. The disclosures of the aforementioned applications are hereby incorporated by reference in their entireties.

TECHNICAL FIELD

Embodiments of the present invention relates to the field of communications technologies, and in particular, to a packet transmission method, a terminal, a network device and a communications system.

BACKGROUND

Transmission Control Protocol (TCP) is a connection-oriented, reliable, byte-stream-based transport-layer communications protocol. To ensure reliable packet transmission, in TCP, one sequence number is assigned for each packet. The sequence number ensures orderly reception of packets transferred to a receive end. For a packet that has been successfully received, the receive end replies with a corresponding acknowledgment (ACK) packet to a transmit end. The acknowledgment packet carries a sequence number of the received packet. If the transmit end does not receive an acknowledgment packet within a proper round-trip time (RTT), a corresponding packet is to be retransmitted. This mechanism is usually referred to as timeout-based retransmission. Fast retransmit is an optimization of timeout-based retransmission. If receiving more than N (generally, N equals 3) duplicate ACKs, the transmit end determines that a packet has been lost, and retransmits the lost packet immediately. According to the fast retransmit mechanism, a packet is retransmitted with no need to wait for expiration of a timeout timer. This greatly improves data transmission efficiency.

Although the timeout-based retransmission and fast retransmit mechanisms ensure reliable packet transmission, if a network condition deteriorates and a transmission delay is relatively long, packet retransmission increases network load, leading to a longer transmission delay and more lost packets. Consequently, a malicious cycle results, and even an entire network is down. In view of this, a congestion control algorithm is introduced to TCP. A mainstream TCP congestion control algorithm is essentially based on an avoidance upon packet loss principle: After determining that a network packet loss occurs, the transmit end proactively decreases a congestion window size, to reduce a transmission rate and further relieve network congestion.

Although the congestion control algorithm can inhibit network congestion to some extent, a data transmission rate may be limited improperly. In particular, in a wireless network environment, channel quality of a radio link is prone to being affected by a plurality of factors. For example, in a scenario such as weak signal coverage, a packet loss occurs on a radio link often due to a non-congestion factor such as a bit error. However, based on the conventional congestion control algorithm, a transmit end determines, based on a packet loss, that network congestion occurs, and proactively decreases a congestion window size. This reduces a downlink throughput of a receive end and affects Internet surfing experience of a user.

SUMMARY

Embodiments of the present invention provide a packet transmission method, a terminal, a network device, and a communications system, to increase a data transmission rate.

To achieve the foregoing objective of embodiments of the present invention, one embodiment of the present invention provides a packet transmission method. The method includes: upon receiving for the first time a retransmitted packet sent by a server, sending, by a terminal to the server, a first acknowledgment packet used to respond to the retransmitted packet received for the first time, where the retransmitted packet is retransmitted by the server after the server determines that a sent first packet has been lost, and a sequence number of the retransmitted packet is the same as a sequence number carried in the first packet; and the first acknowledgment packet includes a repetition indication field, and the repetition indication field is used to indicate that the first packet has been received repeatedly; adding, by a receive end, special information to a TCP header of an acknowledgment packet in response to the retransmitted packet received for the first time, to inform a transmit end that the retransmitted packet has been received repeatedly; and after receiving the first acknowledgment packet, deducing, by the server based on the repetition indication field carried in the first acknowledgment packet, that the first packet has not been lost because of congestion. Therefore, the retransmission and congestion window avoidance that are triggered because of the previously determined loss of the first packet are unnecessary. Based on this, the server compensates a congestion window size and/or a slow start threshold, thereby increasing a downlink throughput.

In a possible design, the first acknowledgment packet is sent by the terminal when the terminal receives for the first time a packet whose sequence number is the same as that of the first packet. In this case, upon receiving for the first time a packet whose sequence number is the same as that of the first packet, the terminal "deceives" the server by using the repetition indication field carried in the first acknowledgment packet, to indicate that the terminal has repeatedly received the packet whose sequence number is the same as that of the first packet, and the server determines, based on this, that the previous determining that the first packet is lost due to congestion is a misjudgment, and further restores the congestion window that is previously reduced because of the determined loss of the first packet, thereby increasing a data transmission rate.

In one embodiment, based on a sequence number of a received packet and a sequence number of a packet that has been received and temporarily stored, the terminal determines whether the packet is a retransmitted packet and whether a packet whose sequence number is the same as that of the packet is received for the first time.

In one embodiment, the first acknowledgment packet further includes a SACK option, and the SACK option is used to indicate sequence number information of a packet that has been received by the terminal.

In one embodiment, the repetition indication field includes the sequence number of the first packet, and the repetition indication field is located in the $1^{st}$ block of the SACK option in the first acknowledgment packet.

In one embodiment, the first acknowledgment packet is a duplicate SACK (DSACK) packet, and the repetition indication field is located in a DSACK block of the packet.

In one embodiment, before the receiving, by a terminal, a retransmitted packet sent by a server, the method further includes: connecting, by the terminal, to a wireless network and establishing a TCP connection to the server, by using at least one access point.

In one embodiment, the terminal and the server have both enabled a SACK option.

One embodiment of the present invention provides a packet transmission method, including: receiving, by a terminal, a retransmitted packet sent by a server, where the retransmitted packet is retransmitted by the server after the server determines that a sent first packet has been lost, and a sequence number of the retransmitted packet is the same as a sequence number carried in the first packet, the retransmitted packet includes a TSval field used to indicate a transmission timestamp of the retransmitted packet, and a value of the TSval field is $TS_{rexmit}$, indicating that an actual transmission time of the retransmitted packet is $TS_{rexmit}$; and upon receiving the retransmitted packet for the first time, sending, by the terminal to the server, a first acknowledgment packet used to respond to the retransmitted packet received for the first time, where the first acknowledgment packet includes a TSecr field used to report the transmission timestamp of the retransmitted packet to the server, a value of the TSecr field is set to be less than that is, less than an actual transmission timestamp of the retransmitted packet.

By using the method, for the retransmitted packet that has been received only once, the terminal forges a timestamp option to add, to the TSecr field, a value less than the actual transmission timestamp of the retransmitted packet, so as to "deceive" the transmit end into believing that the retransmitted packet has been received repeatedly. Therefore, the transmit end deduces that congestion window avoidance because of previous retransmission of a packet having the sequence number is unnecessary, and based on this, compensates a congestion window size and/or a slow start threshold, thereby increasing a data transmission rate.

In one embodiment, a value of the TSecr field in the first acknowledgment packet is less than or equal to a transmission timestamp of a packet whose sequence number is immediately before that of the first packet, and greater than or equal to a transmission timestamp of a packet whose sequence number is immediately after that of the first packet. The TSval field calculated based on this criterion is closer to an actual transmission timestamp of the first packet.

In one embodiment, the terminal and the server have both enabled a TCP timestamp option, and have established a TCP connection.

One embodiment of the present invention provides a method for forwarding a packet between a transmit end and a receive end, including: receiving, by a network device, a retransmitted packet sent by a transmit end to a receive end, forwarding the retransmitted packet to the receive end, and receiving a first acknowledgment packet of the receive end in response to the retransmitted packet, where the retransmitted packet is retransmitted by the transmit end after the transmit end determines that a sent first packet has been lost, and a sequence number of the retransmitted packet is the same as a sequence number carried in the first packet; and the first acknowledgment packet is sent by the receive end when the receive end receives the retransmitted packet for the first time; and adding, by the network device, a repetition indication field to the first acknowledgment packet to obtain a second acknowledgment packet, and sending the second acknowledgment packet, where the repetition indication field is used to indicate that the first packet has been received repeatedly, so that the transmit end increases, after receiving the second acknowledgment packet, a congestion window size and/or a slow start threshold based on the indication by the repetition indication field, thereby increasing a data transmission rate.

In one embodiment, the first acknowledgment packet is sent by the terminal when the terminal receives for the first time a packet whose sequence number is the same as that of the first packet.

In one embodiment, the first acknowledgment packet and the second acknowledgment packet both further include a SACK option, and the SACK option is used to indicate sequence number information of a packet that has been received by the receive end.

In one embodiment, the repetition indication field includes the sequence number of the first packet, and the repetition indication field is located in the $1^{st}$ block of the SACK option in the second acknowledgment packet.

In one embodiment, a connection between the transmit end and the receive end is a TCP connection, and the transmit end and the receive end have both enabled a SACK option or a timestamp option.

One embodiment of the present invention provides a terminal, where the terminal has functions of the terminal in the foregoing method embodiments. The functions may be implemented by using hardware or by executing corresponding software by hardware. The hardware or software includes one or more modules corresponding to the foregoing functions.

In one embodiment, the terminal includes an application processor, a memory, and a communications subsystem, where the communications subsystem is configured to: receive a packet and send an acknowledgment packet, and the application processor runs a protocol stack program in the memory to perform the functions of the terminal in the method embodiments.

In one embodiment, a structure of the terminal includes a receiving unit, a processing unit, and a sending unit, where these units may perform corresponding functions in the method embodiments. For details, refer to detailed descriptions in the method embodiments, and details are not described again.

One embodiment of the present invention provides a network device, where the network device has functions of the network device in the method embodiments. The functions may be implemented by using hardware or by executing corresponding software by hardware. The hardware or software includes one or more modules corresponding to the foregoing functions.

One embodiment of the present invention provides a communications system, where the system includes a server and the terminal according to the foregoing aspects, and the system may further include another terminal-interacting device in the solutions provided in the embodiments of the present invention.

One embodiment of the present invention provides a computer storage medium, configured to store computer software instructions used by the terminal or the network device, where the computer storage medium includes a program designed for executing the foregoing aspects.

Compared with the prior art, in the solutions provided in embodiments of the present invention, a receive end adds special information to a header of an acknowledgment packet in response to a retransmitted packet received for the first time to inform a transmit end that the retransmitted packet has been received repeatedly, and sends the acknowledgment packet to the transmit end; and after receiving the acknowledgment packet, the transmit end may deduce, based on the special information carried in the acknowledgment packet, that this packet loss is disordered reception rather than a congestion-caused packet loss, and that retransmission and congestion window avoidance that are triggered because of this packet loss are unnecessary. Based on this, the transmit end compensates a congestion window size and a slow start threshold, thereby increasing a downlink throughput.

BRIEF DESCRIPTION OF DRAWINGS

To describe the technical solutions in the embodiments of the present invention or in the prior art more clearly, the following briefly describes the accompanying drawings required for describing the embodiments or the prior art.

FIG. 8 is a schematic diagram of a SACK option format;

DESCRIPTION OF EMBODIMENTS

To make persons skilled in the art understand the embodiments of the present invention better, the following clearly describes embodiments of the present invention with reference to the accompanying drawings.

Figure 1:
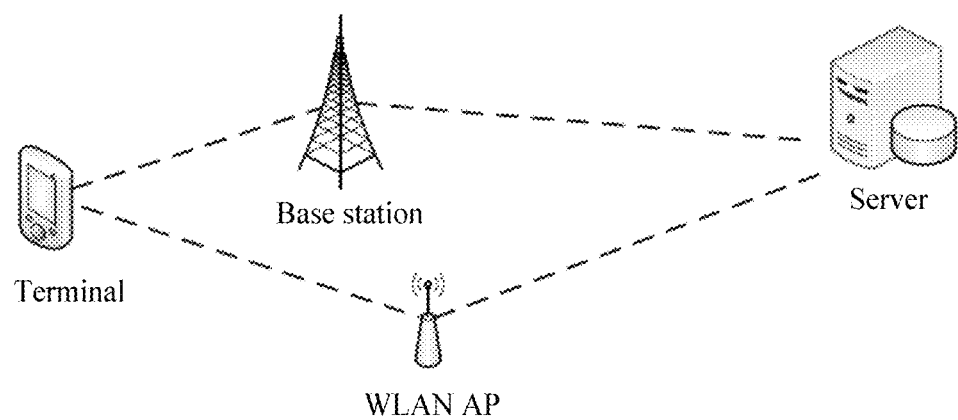
FIG. 1 is a schematic diagram of a wireless network transmission scenario.

FIG. 1 shows a typical wireless network transmission scenario. A terminal connects to a wireless network by using an access point of a cellular network or a wireless local area network (WLAN), and then transmits data to an application server based on a particular network protocol. For example, the server may send data to the terminal in packets as requested by the terminal; or the terminal may encapsulate local data into a packet, and send the packet to the server by using a network. In some other scenarios, data transmission may alternatively be performed between the terminal and the server by using a wired link. However, regardless of which type of link is used, packet loss occurs inevitably in a data transmission process. Therefore, to ensure reliable data transmission, Transmission Control Protocol (TCP) becomes a first choice for a transport protocol between different devices. A slow start mechanism, a congestion control mechanism, a timeout-based retransmission mechanism, and the like are introduced to TCP to ensure data transmission reliability. However, these mechanisms greatly limit a data transmission rate, and reduce link utilization. An objective of embodiments of the present invention is to increase a data transmission rate and improve link utilization while ensuring reliable data transmission. It can be understood that any device based on a TCP/IP protocol stack is applicable to the technical solutions provided in embodiments of the present invention. The TCP/IP protocol stack is a component used to implement a TCP/IP protocol suite defined by a TCP/IP reference model, and the TCP/IP protocol suite includes two core protocols: Transmission Control Protocol (TCP) and Internet Protocol (IP). The TCP/IP reference model is an abstract layered model. In this model, all network protocols are classified into five abstract "layers": a physical layer, a link layer, a network layer, a transport layer, and an application layer. Definitions of these layers are all made in the prior art, and details are not described in the embodiments of the present invention.

In the specification, claims, and accompanying drawings of embodiments of the present invention, the term "terminal" is a device that provides voice and/or data connectivity for a user, for example, a wireless terminal or a wired terminal. The wireless terminal may be a handheld device with a wireless connection function, an Internet of Things device, or another processing device connected to a wireless modem. For example, the wireless terminal may be a mobile phone (or referred to as a "cellular" phone) or a computer having a mobile terminal. For another example, the wireless terminal may alternatively be a portable, pocket-sized, handheld, or computer built-in mobile apparatus, or an in-vehicle mobile apparatus. For still another example, the wireless terminal may be a part of a mobile station or user equipment (UE). The "packet" is a base unit of network transmission and is data organized in a specified format. There are different definitions for a packet format in different types of network protocols. However, usually, one packet may include a header and a payload. The header includes information that is necessary in a packet transmission process, for example, address information and a flag bit. The payload is also referred to as a data section of a packet, and includes data content to-be-sent. The terms "first", "second", "third", "fourth", and the like (if existent) are intended to distinguish between similar objects, but do not necessarily indicate a particular order or a specific sequence.

Figure 2:
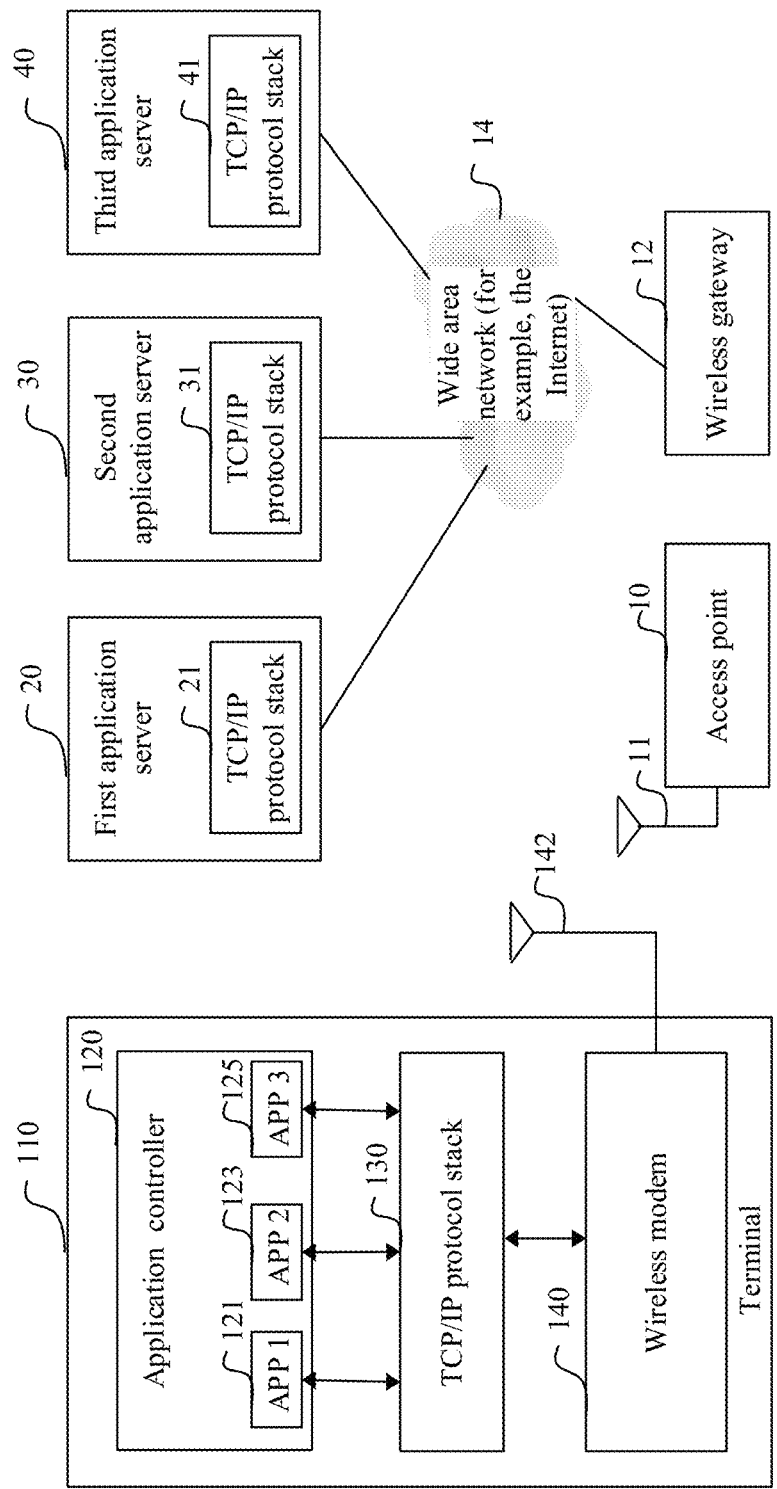
FIG. 2 is a schematic diagram of a communications system according to an embodiment of the present invention.

FIG. 2 is a simplified block diagram of a communications system 100 according to an embodiment of the present invention. The communications system 100 is used only as an application scenario of embodiments of the present invention, and should not be understood as limitation on the application scenario of embodiments of the present invention.

The communications system 100 includes a terminal 110, an access point 10, a wireless access gateway 12, a wide area network 14, a first application server 20, a second application server 30, and a third application server 40. Persons skilled in the art may understand that one communications system may usually include fewer or more components than those shown in FIG. 2, or include components different from those shown in FIG. 2. FIG. 2 shows only components more related to the plurality of disclosed embodiments of the present invention.

For example, although three application servers 20, 30, and 40 have been described in FIG. 2, persons skilled in the part may understand that one communications system may include any quantity of application servers, or even include no application server. The application servers 20, 30, and 40 include corresponding TCP/IP protocol stacks 21, 31, and 41, respectively. Functions of the TCP/IP protocol stacks 21, 31, and 41 may be executed by a proper combination of software, hardware, and/or firmware that run/runs on the application servers 20, 30, and 40, respectively. The wide area network 14 may include one of a public network, a private network, and the Internet, and/or any combination thereof. The access point may be implemented as or referred to as a base station, a NodeB, an eNodeB, a radio network controller (RNC), a base station controller (BSC), a base transceiver station (BTS), a transceiver function, a radio transceiver, a radio route, a base service set, or any other similar terms. The gateway 12 and the access point 11 may be included in one wireless network. For brevity, other parts of the wireless network are not described.

The terminal 110 includes an application controller 120, a TCP/IP protocol stack 130, and a wireless modem 140. The wireless modem 140 is connected to an antenna 142. Persons skilled in the art may understand that the terminal 110 may include fewer or more components than those shown in FIG. 2. The access terminal 110 shown in FIG. 2 includes only components more related to the plurality of embodiments disclosed in the specification.

The application controller 120 is configured to control and/or monitor an application that runs on the terminal 110. For example, a first application 121, a second application 123, and a third application 125 run under control of the application controller 120. The first application 121, the second application 123, and the third application 125 are client-side application of the first application server 20, the second application server 30, and the third application server 40, respectively. Persons skilled in the art may understand that the TCP/IP protocol stack 130 may be executed by a proper combination of software, hardware, and/or firmware. The TCP/IP protocol stack 130, the wireless modem 140, and the antenna 142 cooperate to complete data sending and receiving. The application controller 120 may be specifically a processor or a processor core.

The first application 121 may be a web page browser that requests information from the first application server 20. To facilitate communication between the first application 121 and the first application server 21, the first application 121 and the server both create a corresponding socket, establish a TCP/IP connection based on the socket, and then transmit data by using the TCP/IP connection. The client socket and the server socket are referred to as a socket pair. Each socket is usually described by using a unique 5-tuple structure. The unique 5-tuple structure includes a protocol ID, a source IP address, a destination IP address, a source port number, and a destination port number.

Establishment of the TCP/IP connection between the first application 121 and the first application server 21 may be initiated by the first application 121. The first application 121 generates a socket open command (socket open). The command is transferred to the TCP/IP protocol stack 130, to trigger the TCP/IP protocol stack 130 to establish a TCP/IP connection to the first application server 21 through three message interactions (also referred to as "three hand-shakes"); then the TCP/IP protocol stack notifies the first application 121 that the connection has been established.

Figure 3:
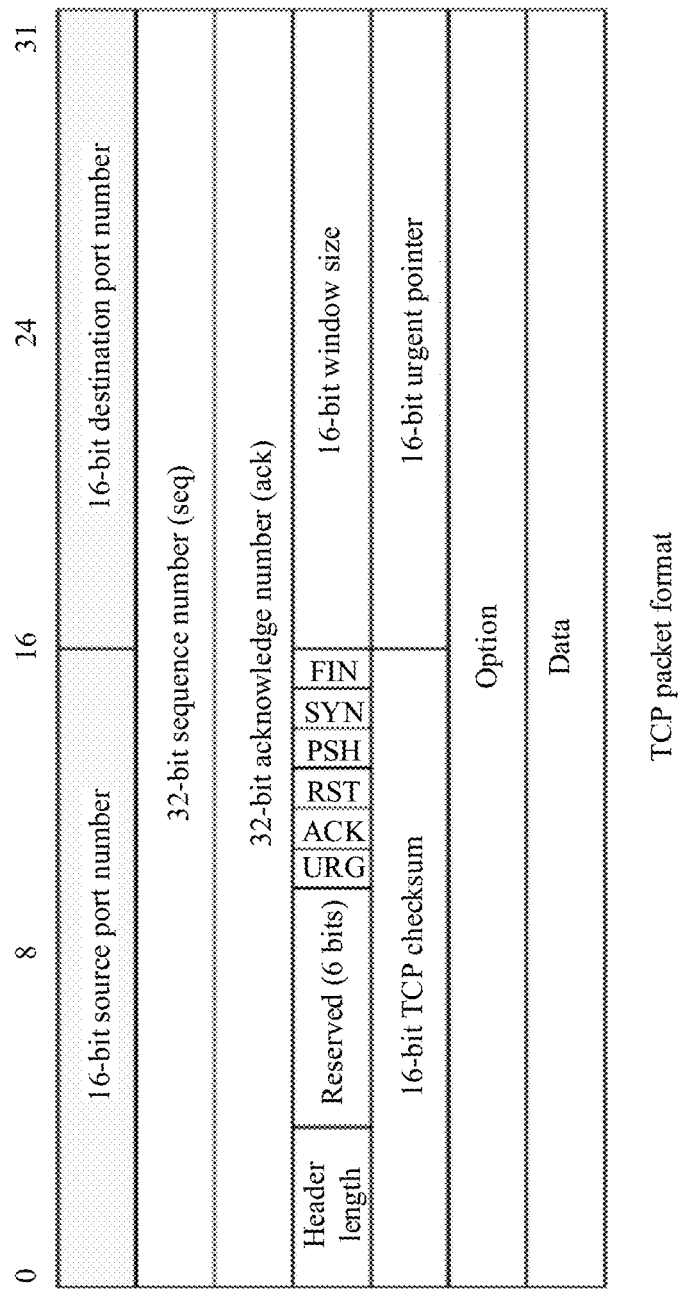
FIG. 3 is a schematic diagram of a TCP packet format.

Next, the first application 121 and the first application server 21 can transmit, based on the established TCP connection, data encapsulated into a TCP packet. FIG. 3 shows a TCP packet format. A source port and a destination port are configured to determine application processes of a transmit end and a receive end. A TCP connection may be uniquely determined by using the source port, the destination port, the source IP address, and the destination address. A sequence number (usually briefly referred to as seq) field in a TCP packet header is used to indicate a packet sequence number. Usually, the packet sequence number is a sequence number of the $1^{st}$ data byte in the packet payload. After receiving the TCP packet, the receive end sends an acknowledgment packet (ACK for short) packet to the transmit end. An acknowledge number (Acknowledge Number, ack for short usually) field value of an ACK header represents a "Sequence Number" field value of the packet received by the receive end, and also means that the receive end has received all packets sent by the transmit end whose "Sequence Number" values are less than the "Acknowledge Number" of the ACK packet. A window size is used to indicate a size of a current receive buffer of the receive end. In addition, the TCP packet header still includes six flag bits and one customizable option field (Option). The option field may be used to carry additional information. Definitions of the six flag bits are as follows:

URG: urgent pointer in effect;
ACK: acknowledgment number in effect;
PSH: immediate sending to an application layer for processing;
RST: reset upon an exception;
SYN: a synchronization flag, where setting to 1 means a connection is established; and
FIN: a finish flag, requesting to release a connection.

The following describes TCP retransmission and congestion control mechanisms by using specific examples. For simplified descriptions, in this embodiment of the present invention, one of two connected devices is referred to as a transmit end, and the other device is referred to as a receive end. It can be understood that the transmit end and the receive end may be any device that has a transmitting and receiving capability. For example, the transmit end may be the server, and the receive end may be the terminal. In addition, the transmit end and the receive end are two opposing roles, and are interchangeable. To be specific, a device may be a transmit end in one scenario, and may be a receive end in a different scenario.

The TCP retransmission mechanism ensures reliable packet transmission, and the retransmission mechanism mainly includes timeout-based retransmission and fast retransmit. A basic process of timeout-based retransmission is: The transmit end starts a timeout timer after sending a packet, and the transmit end retransmits the packet if the timeout timer expires before receiving an acknowledgment packet indicating that the packet has been correctly received. A value of the timeout timer is usually expressed by a retransmission timeout (RTO). The RTO is usually set to be the same as an RTT (Round Trip Time), which is a time it takes for a packet to be sent plus a time it takes for an acknowledgment of that packet to be received. The RTT may be obtained through sampling.

Figure 4:
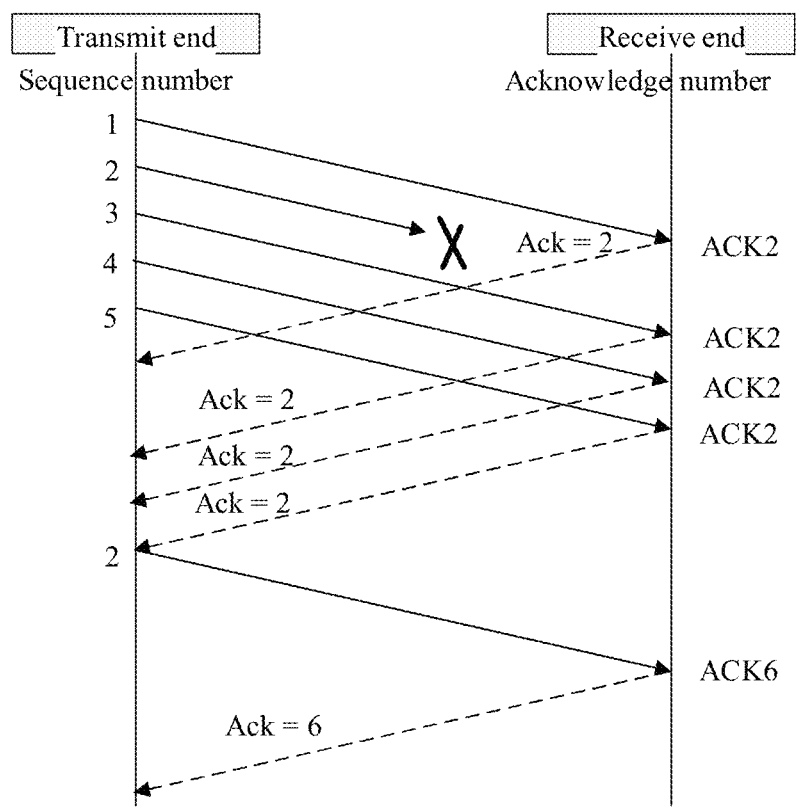
FIG. 4 is a conceptual diagram of a fast retransmit method in the prior art.

A fast retransmit algorithm is not driven by time, but driven by data. As shown in FIG. 4, it is assumed that the transmit end has sent five packets with sequence numbers 1, 2, 3, 4, and 5. A packet having a sequence number 1 (packet 1 for short) is earliest received by the receive end, and the receive end replies with ACK2, an acknowledgment packet with an acknowledgment number ack=2; if the packet 2 does not arrive at the receive end due to network congestion or a packet loss, but the packet 3 arrives, the receive end still replies with the ACK2. Because TCP uses an accumulative acknowledgment mechanism, if packets arrive in disorder or a packet loss occurs, the receive end only repeatedly acknowledges the last packet that arrives in order. A sequence number of the ACK cannot be changed, and can be only a sequence number of the last orderly packet that arrives at the receive end. Similarly, if both the packets 4 and 5 have arrived but the packet 2 has not arrived at the receive end, a sequence number of a cumulative acknowledgement sent by the receive end is still 2. In this case, the transmit end has received more than three acknowledgment packets with ack=2, and determines that the packet 2 has been lost. Then the transmit end immediately retransmits the packet having the sequence number 2. Then the receive end receives the packet 2. In this case, because the packets 3, 4, and 5 have all been received, the receive end replies with ACK6, an acknowledgment packet with an acknowledgment number ack=6. It can be learned that, after the fast retransmit mechanism is introduced, if some packets in a sent sequence are lost, the transmit end retransmits a packet that immediately follows a sequence number of a final cumulative acknowledgement. As such, packets that have been correctly received previously may be sent repeatedly, increasing network congestion and declining TCP transmission performance.

Figure 5:
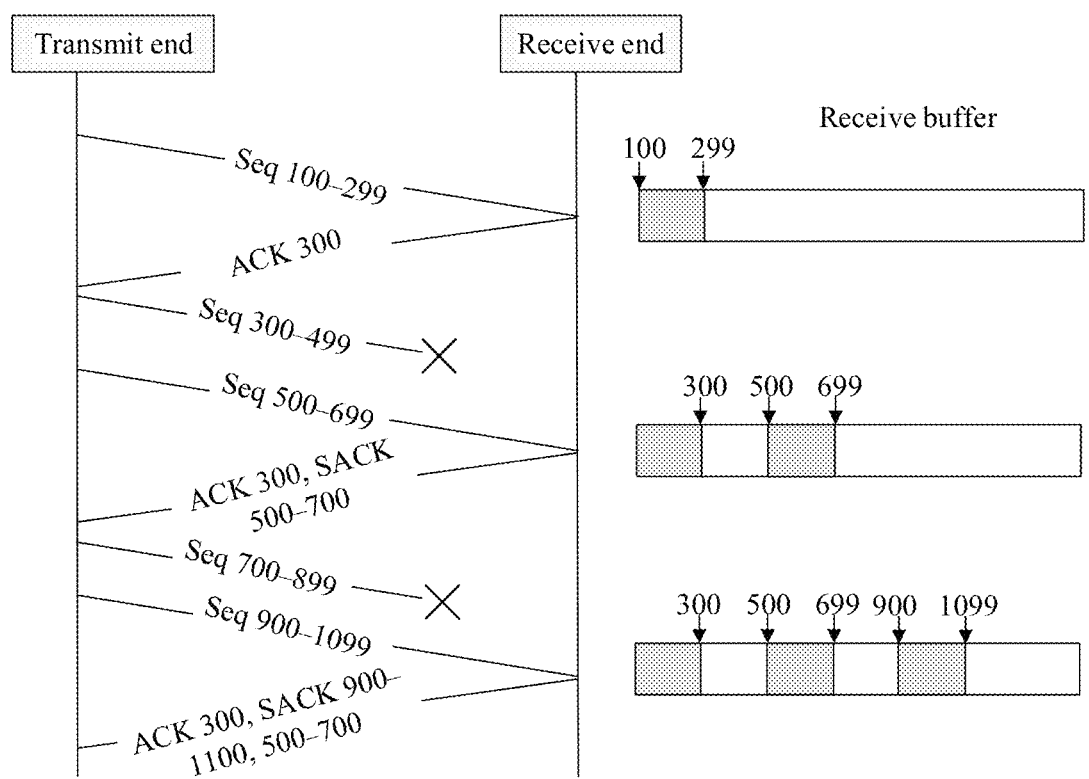
FIG. 5 is a schematic diagram of a selective acknowledgment (SACK) method in the prior art.

RFC 2018 proposes a selective acknowledgment (SACK) technology. A selective acknowledgment (SACK) option is added to an acknowledgment packet header, to indicate that the receive end has received and temporarily stored discontinuous data blocks. The transmit end may check, based on this information, which data has been lost. As shown in FIG. 5, the transmit end may know, based on a SACK option in an acknowledgment packet returned by the receive end, which packets have been received by the receive end, and which packets have not been received by the receive end. In this case, the transmit end needs to retransmit only a lost packet, rather than send all packets following a cumulative acknowledgement.

TCP can ensure reliable data transmission by using the retransmission mechanism, but retransmission may also aggravate network congestion, especially when a network transmission delay is relatively long. To relieve the network congestion problem, TCP introduces congestion control algorithms. The congestion control algorithms mainly include: (1) a slow start algorithm; and (2) a congestion avoidance algorithm. A principle of the slow start algorithm is as follows:

(1) after a TCP connection is established, a congestion window is initialized as cwnd=1 (the full spelling of cwnd is Congestion Window), indicating that one packet or one piece of MSS (Maximum Segment Size) data can be sent;

(2) each time when an ACK is received, cwnd increments by 1, presenting a linear growth; and (3) each time when an RTT expires, cwnd=cwnd*2.

Figure 6:
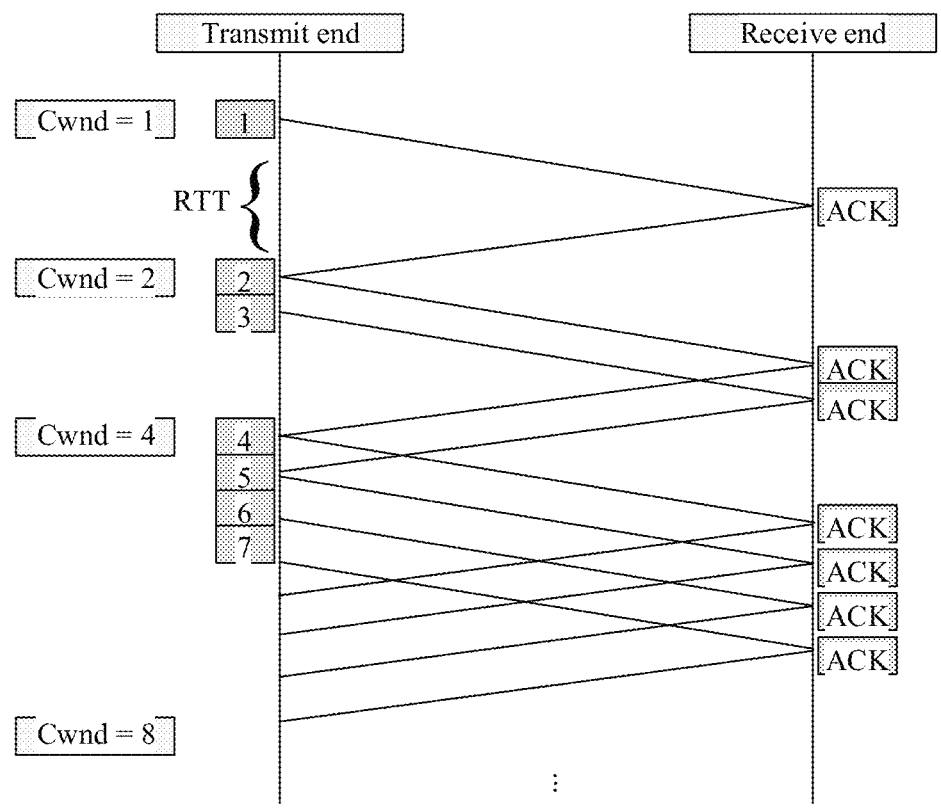
FIG. 6 is a schematic diagram of a congestion control method in the prior art.

Specifically, as shown in FIG. 6, cwnd increases from 1 to 2, and then increases from 2 to 4, presenting an exponential growth. Certainly, it is impossible for cwnd to increase unlimitedly. Therefore, the transmit end further sets a slow start threshold ssthresh, indicating an upper limit of a congestion window size. When cwnd>=ssthresh, the "congestion avoidance algorithm" takes effect. Generally, a value of ssthresh is 65535 bytes. When cwnd reaches this value, the congestion avoidance algorithm is triggered. A typical congestion avoidance algorithm is as follows:

(1) when an ACK is received, cwnd=cwnd+1/cwnd; and (2) each time when an RTT expires, cwnd=cwnd+1.

In this way, packets are prevented from increasing excessively quickly to lead to network congestion, but increase slowly until adjusted to an optimal value of a network.

Further, when a packet loss occurs in a data transmission process, timeout-based retransmission or fast retransmit is inevitably triggered, and when retransmitting a lost packet, the transmit end determines, based on the packet loss, that network congestion has occurred, and therefore reduces a congestion window size, so as to lower a speed of injecting packets into the network, thereby relieving network congestion. It can be understood that, in different algorithms, different definitions may be provided for a specific manner of reducing a congestion window size, and are not listed one by one herein. In addition, some congestion avoidance algorithms also help reduce a slow start threshold ssthresh while reducing the congestion window size.

Based on the retransmission upon packet loss and avoidance upon packet loss solutions, an embodiment of the present invention provides a packet transmission method. A basic principle of the packet transmission method includes: A receive end adds special information to a TCP header of an acknowledgment packet in response to a retransmitted packet received for the first time, to inform a transmit end that the retransmitted packet has been received repeatedly, and sends the acknowledgment packet to the transmit end; and after receiving the acknowledgment packet, the transmit end deduces, based on the special information carried in the acknowledgment packet, that this packet loss is disordered reception rather than a congestion-caused packet loss, and that retransmission and congestion window avoidance that are triggered because of this packet loss are unnecessary. Based on this, the transmit end compensates a congestion window size and a slow start threshold, thereby increasing a downlink throughput. The following describes aspects of the present invention by using a more specific embodiment.

Figure 7:
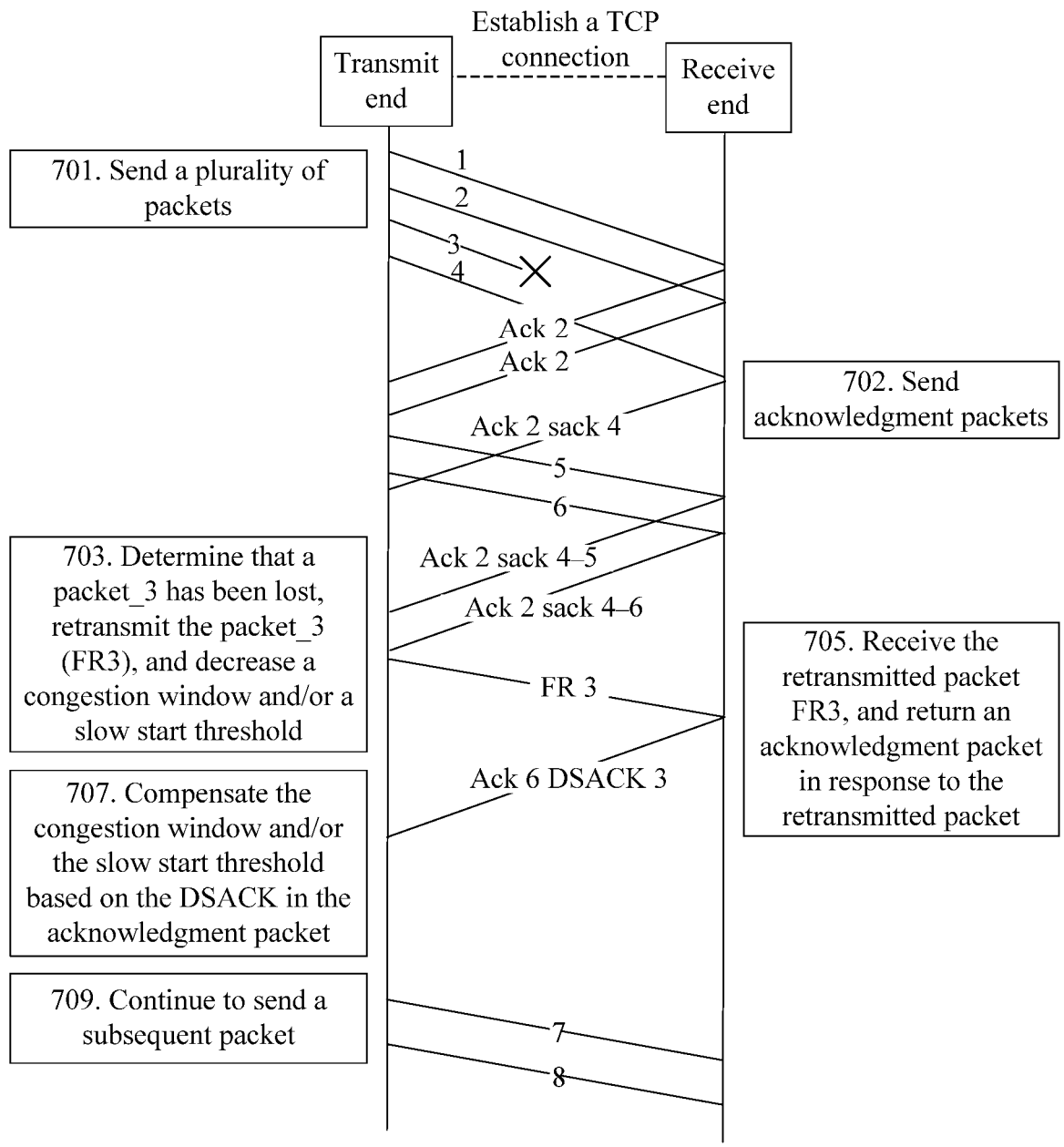
FIG. 7 is a flowchart of a packet transmission method according to an embodiment of the present invention.

As shown in FIG. 7, an embodiment of the present invention provides a packet transmission method. The method includes the following operations.

Operation 701. After establishing a TCP connection to a receive end through three handshakes, a transmit end transmits a plurality of packets (for example, packets 1 to 4 in FIG. 7) to the receive end by using the TCP connection.

Operation 702. The receive end returns acknowledgment packets (shown by arrows from the receive end to the transmit end in FIG. 7) to the transmit end after receiving the packets from the transmit end, where the returned acknowledgment packets are in response to the packets that have been received by the receive end. To be specific, each time when a packet is successfully received, the receive end constructs a corresponding acknowledgment packet in response to the packet, and sends the corresponding acknowledgment packet to the transmit end.

In one embodiment, sequence numbers (seq) of packets sent by the transmit end increase progressively. An amplitude of the progressive increase is related to a quantity of bytes in a transmitted packet. For example, after three handshakes, first two packets sent by the transmit end are both 1440 bytes long, a seq of the $1^{st}$ packet is an initial value 1, and then a seq of the $2^{nd}$ packet is 1441. Correspondingly, if the receive end receives the $1^{st}$ packet correctly, the receive end returns an acknowledgment packet in response to the $1^{st}$ packet, to indicate that the $1^{st}$ packet has been received and that an ack of the returned acknowledgment packet is the seq of the $2^{nd}$ packet, that is, 1441. When the transmit end sends subsequent packets, a packet seq change and an ack change of an acknowledgment packet returned by the receive end may be derived by that analogy. In addition, for definitions of the seq and the ack, refer to FIG. 3 and the related embodiment, and details are not described again herein.

After operation 701, the transmit end may further record a largest sequence number of the sent packets, for subsequent packet loss detection.

Operation 703. After determining, based on a packet loss detection algorithm, that a first packet has been lost, the transmit end immediately retransmits the lost first packet, and triggers a congestion avoidance algorithm to decrease a congestion window size and/or a slow start threshold. The first packet (that is, FR 3) that is retransmitted is also referred to as a retransmitted packet, and a sequence number of the retransmitted packet FR3 is the same as a sequence number carried in the first packet.

Operation 705. After receiving the retransmitted packet FR 3 for the first time, the receive end immediately constructs a first acknowledgment packet corresponding to the retransmitted packet, and sends the first acknowledgment packet to the transmit end. The first acknowledgment packet includes a repetition indication field, and the repetition indication field is used to indicate that the first packet has been received repeatedly. The "immediately" described herein means being within a proper processing time interval after the retransmitted packet FR 3 is received, where the time interval is greater than or equal to 0, and is less than or even far less than a period of a timeout timer for the first packet. For example, if the period of the timeout timer corresponding to the first packet is T, a predetermined time interval should be less than T, or less than T/2, or even less than T/4. Preferably, the predetermined time interval equals 0 or approaches 0, which means that the receive end sends the first acknowledgment packet almost simultaneously upon receiving the retransmitted packet FR3.

Specifically, in an embodiment, before receiving the retransmitted packet FR3 for the first time, the receive end has not received any packet whose sequence number is the same as that of the retransmitted packet FR3 (which is the same as sequence number of the first packet). In other words, the first acknowledgment packet is sent by the receive end when the receive end receives for the first time a packet whose sequence number is the same as that of the first packet.

Operation 707. The transmit end receives the first acknowledgment packet, and compensates the congestion window size based on a repetition indication field carried in the first acknowledgment packet. Specifically, the transmit end deduces, based on a packet sequence number in the repetition indication field, that the first packet has been received in disorder rather than lost because of congestion, and that the retransmission and congestion window avoidance that are triggered because of the loss of the first packet are unnecessary. Therefore, the transmit end increases a congestion window size. Optionally, in an embodiment, the transmit end also increases a slow start threshold while increasing the congestion window size.

In operation 703, there are a plurality of packet loss detection algorithms that can be used by the transmit end. Using a fast retransmit mechanism shown in FIG. 4 as an example, if the transmit end receives N (generally, N equals 3) or more acknowledgment packets with a same ack value, it may be determined, based on acks of the N acknowledgment packets, that a first packet whose sequence number is the same ack value plus 1 has been lost. For another example, in another embodiment, if the transmit end and the receive end have both enabled a SACK function, an acknowledgment packet returned by the receive end carries an additional SACK option, to indicate information of packets in a receive buffer. The receive buffer is used to temporarily store a received packet. The SACK option is located in an option field in a TCP header. FIG. 8 shows a format of the SACK option. The SACK option includes one or more blocks, and each block indicates a boundary of a discontinuous block received by the receive end. For example, Left Edge of $1^{st}$ Block is a sequence number of the $1^{st}$ packet of the discontinuous block, Right Edge of $1^{st}$ Block is a sequence number following a sequence number of the last packet of the discontinuous block, and so on. The SACK option has a variable length, and each block occupies 32 bytes. Because a length of an entire TCP option does not exceed 40 bytes, the SACK includes a maximum of four blocks, which mean four groups of boundary values. The SACK option is generated by the receive end and notified to the transmit end. The transmit end may determine a lost packet based on this information and retransmit the lost packet.

In operation 703, the transmit end may alternatively start timeout-based retransmission after the timeout timer for the first packet expires, to retransmit the first packet. For specific implementation details of timeout-based retransmission, refer to the foregoing embodiment. Usually, timeout timer periods set for all packets by a protocol stack are the same. In other words, all the packets have the same timeout timer period.

Similarly, there are a plurality of congestion avoidance algorithms for operation 703. In an embodiment, if a loss of the first packet leads to timeout-based retransmission, the transmit end may decrease the slow start threshold to cwnd/2, and then set cwnd to 1, to enter a slow start process again. In another embodiment, after determining, based on the ACK, that the first packet has been lost and starting fast retransmit, the transmit end may decrease the congestion window size by half and set the slow start threshold to an updated congestion window size. In another embodiment, alternatively, after determining that the first packet has been lost, the transmit end may only decrease the congestion window size by ½, ⅓, or another proper value, but not adjust the slow start threshold. It can be understood that, for different congestion avoidance algorithms, the amplitude and manner for reducing the congestion window size and the slow start threshold vary, but all based on the principle of avoidance upon packet loss. That is, after determining that a network packet loss has occurred, the transmit end proactively decreases the congestion window size and/or the slow start threshold.

For specific implementation details about the congestion avoidance algorithm, refer to FIG. 6 and the related embodiment, and details are not described again herein.

In operation 705, the receive end determine, based on the sequence number of the received retransmitted packet and a sequence number of a packet that has currently been received and stored temporarily, whether the retransmitted packet is received for the first time.

In one embodiment, the repetition indication field in operation 705 includes the sequence number of the first packet. In another embodiment, the repetition indication field may include both the sequence number and a length (usually described in bytes) of the first packet.

In one embodiment, if the transmit end and the receive end have both enabled a SACK option, the repetition indication field is located in the SACK option in the first acknowledgment packet. Preferably, the repetition indication field may be located in the 1$^{st}$ block of the SACK option in the first acknowledgment packet. The block may also be referred to as a DSACK block, and is used to report a duplicate packet received by the receive end to the transmit end. For example, the receive end proactively constructs a field including the sequence number of the first packet, and inserts the field into the 1$^{st}$ block of the SACK option in the first acknowledgment packet. After the insertion, if the SACK option in the first acknowledgment packet exceeds a maximum limit (four blocks), the last block is deleted.

In another embodiment, the repetition indication field is located in another unoccupied field in a header of the first acknowledgment packet. In another embodiment, alternatively, the repetition indication field and an existing field in a header of the first acknowledgment packet may use a same field. For example, in a field having 32 bytes occupied by the ack field, some bytes may be assigned to the repetition indication field.

In the packet transmission method provided in this embodiment of the present invention, for the retransmitted packet that has been received only once, the receive end adds the repetition indication field containing the sequence number of the retransmitted packet to the header of the acknowledgment packet in response to the retransmitted packet, and sends the acknowledgment packet to the transmit end, to "deceive" the transmit end into believing that the retransmitted packet has been received repeatedly, and after receiving the acknowledgment packet containing the repetition indication field, the transmit end deduces, based on the sequence number recorded in the repetition indication field, that the congestion window avoidance because of previous retransmission of the packet having the sequence number is unnecessary, and based on this, the transmit end compensates the congestion window size and/or the slow start threshold.

Figure 9:
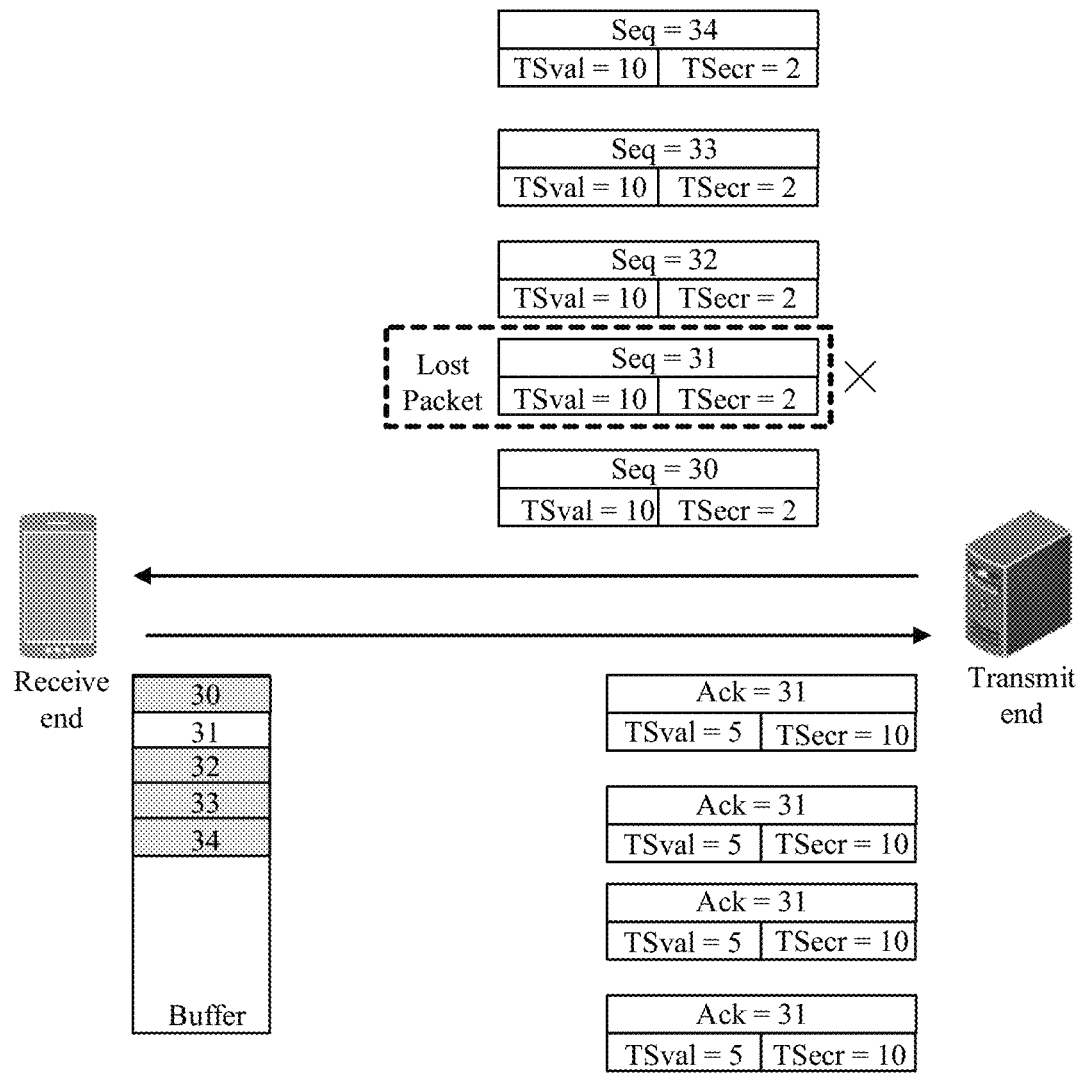
FIG. 9 is a structural diagram of a SACK option according to an embodiment of the present invention.

The following table describes results of testing the packet transmission method provided in this embodiment of the present invention in a network environment. The packet transmission method provided in this embodiment of the present invention is used in a wireless network scenario, and a downlink throughout of a mobile terminal increases by about 30%.

to represent a timestamp for the transmit end to send a TCP packet, and when sending an ACK in response to the TCP packet, the receive end echoes a TSval value of the TCP packet to the TSecr field in the ACK when sending the ACK in response to the TCP packet. Because the TCP connection is bidirectional, the receive end places its current timestamp into the TSval field when echoing TSecr in the ACK. The timestamp is a value that increases progressively in a monotonic manner along with time. Because the receive end only needs to simply echo TSval in the ACK, both sides of communication do not need to perform time synchronization. Specifically, as shown in FIG. 9, the transmit end sends five packets with sequence numbers 30 to 34 to the receive end. TSval of each packet indicates a transmission timestamp 10 of the packet. Correspondingly, each time after a packet is received, the receive end sends an ACK in response to the packet to the transmit end, and fills in the TSecr field in the ACK with the TSval value 10 of the packet. The TSval field in the ACK indicates a timestamp 5 when the receive end sends this ACK.

Figure 11:
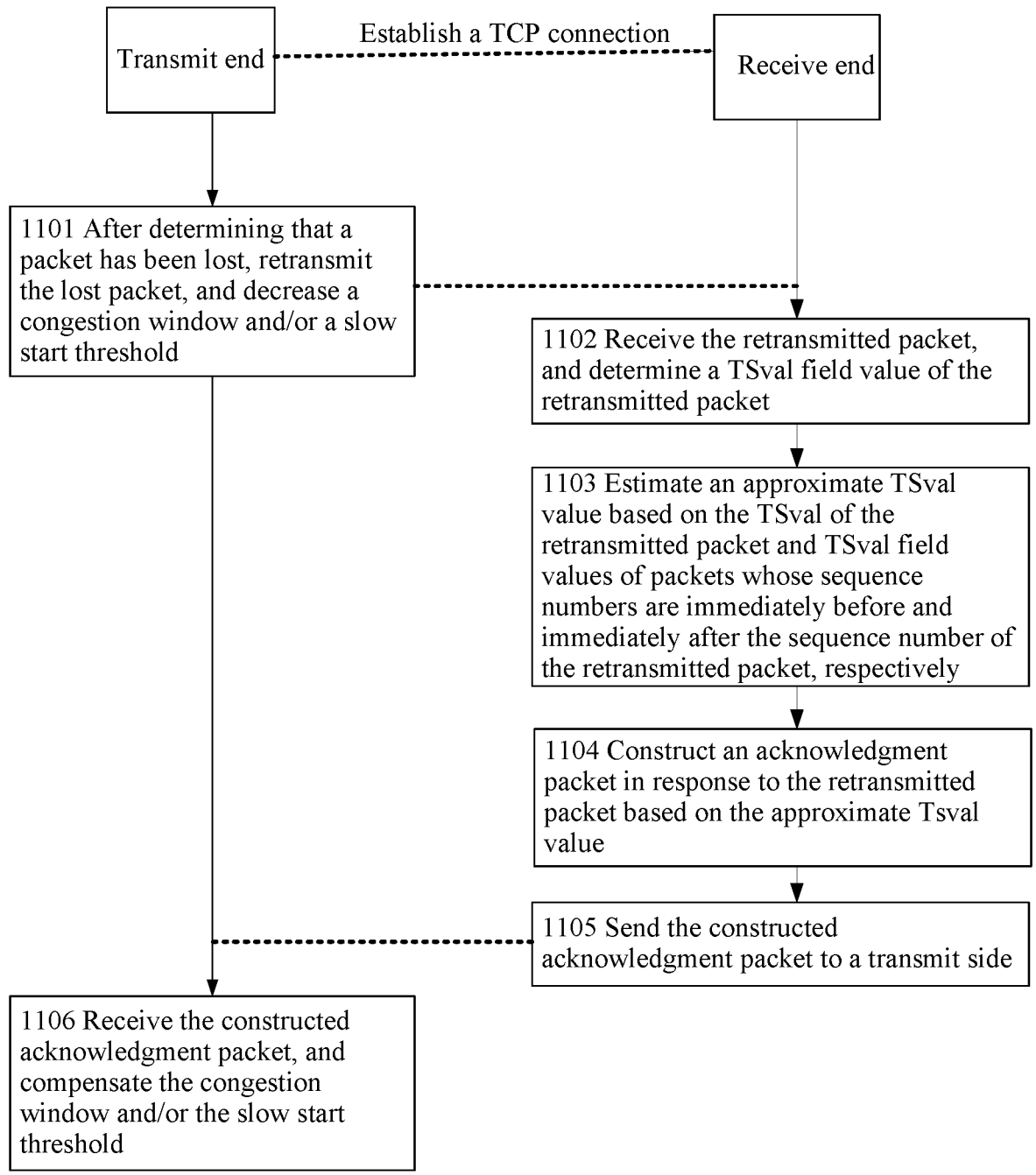
FIG. 11 is a schematic diagram of another packet transmission method according to an embodiment of the present invention.

Further, in a scenario in which the transmit end and the receive end have both enabled a timestamp option, based on the principle of the packet transmission method described in the embodiment related to FIG. 7, an embodiment of the present invention provides another packet transmission method, which, as shown in FIG. 11, includes the following operations.

Figure 10:
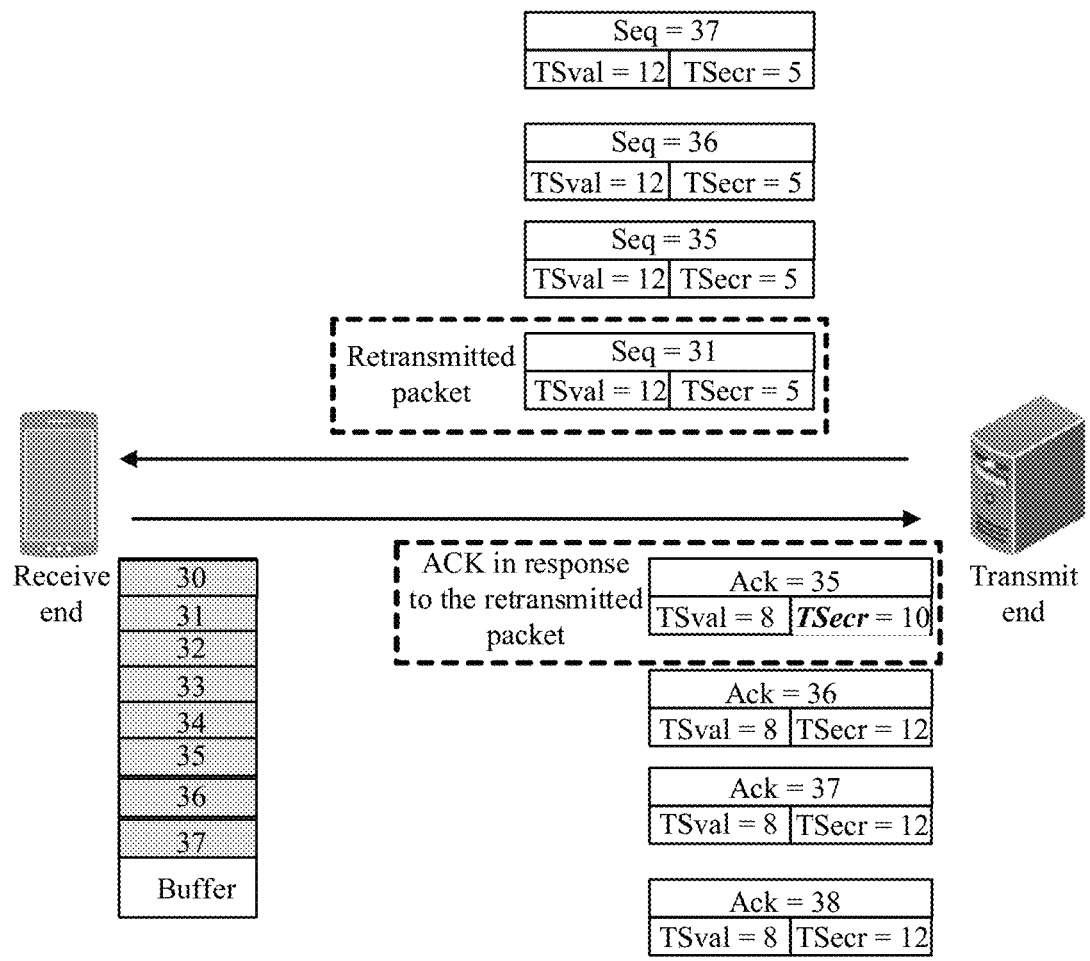
FIG. 10 is a schematic diagram of data transmission in a scenario in which a timestamp option is enabled.

Operation 1101. After determining, based on a received acknowledgment packet, that a packet has been lost, a transmit end retransmits the lost packet, and decreases a congestion window size and/or a slow start threshold. As shown in FIG. 9, the transmit end has received a plurality of acknowledgment packets with ack=31, and determines that a packet having a sequence number 31 has been lost. Further, as shown in FIG. 10, the transmit end immediately retransmits the packet having the sequence number 31. The sequence number of the retransmitted packet remains unchanged, but a transmission timestamp TSval is updated to 12 (a timestamp of sending the packet having the sequence number for the first time is 10). In addition, when retransmitting the packet having the sequence number 31, the transmit end may also continue to send packets with sequence numbers 35 to 37.

| Sequence Number | Mobile phone 1 (before optimization) | Mobile phone 2 (before optimization) | Mobile phone 3 (after optimization) | Computer (before optimization) | Computer (after optimization) |
|---|---|---|---|---|---|
| 1 | 1.53 MB/s | 1.47 MB/s | 1.73 MB/s | 1.19 MB/s | 2.01 MB/s |
| 2 | 1.64 MB/s | 1.39 MB/s | 2.19 MB/s | 1.38 MB/s | 2.23 MB/s |
| 3 | 1.62 MB/s | 1.28 MB/s | 2.15 MB/s | 1.51 MB/s | 2.51 MB/s |
| 4 | 1.48 MB/s | 1.30 MB/s | 2.15 MB/s | 1.33 MB/s | 2.57 MB/s |
| 5 | 1.32 MB/s | 1.42 MB/s | 2.33 MB/s | 1.70 MB/s | 2.20 MB/s |
| 6 | 1.38 MB/s | 1.40 MB/s | 2.17 MB/s | 1.47 MB/s | 2.42 MB/s |
| 7 | 1.35 MB/s | 1.52 MB/s | 2.14 MB/s | 1.62 MB/s | 2.53 MB/s |
| 8 | 1.47 MB/s | 1.45 MB/s | 2.37 MB/s | 1.68 MB/s | 2.55 MB/s |
| 9 | 1.31 MB/s | 1.31 MB/s | 2.14 MB/s | 1.52 MB/s | 2.69 MB/s |
| 10 | 1.38 MB/s | 1.50 MB/s | 2.12 MB/s | 1.50 MB/s | 2.99 MB/s |
| 11 | 1.44 MB/s | 1.55 MB/s | 2.32 MB/s | 1.42 MB/s | 2.74 MB/s |
| 12 | 1.51 MB/s | 1.69 MB/s | 2.30 MB/s | 1.30 MB/s | 2.49 MB/s |
| Average | 1.45 MB/s | 1.44 MB/s | 2.18 MB/s | 1.47 MB/s | 2.49 MB/s |

In another scenario, if the transmit end and the receive end have both enabled a timestamp option, each TCP packet includes two timestamp fields (TSval and TSecr). Usually, lengths of both TSval and TSecr are 32 bits. TSval is used Operation 1102. After receiving for the first time the retransmitted packet (for example, the packet having the sequence number 31 in FIG. 10) sent by the transmit end, a receive end reads a TSval field in a timestamp option in the retransmitted packet, where a value of the TSval field is $TS_{rexmit}$, used to indicate a transmission timestamp of the retransmitted packet. In an example shown in FIG. 10, the value of the TSval field in the retransmitted packet is 12, that is, $TS_{rexmit}=12$, indicating that the transmission timestamp of the retransmitted packet is 12.

Operation 1103. The receive end reads TSval field values in timestamp options of packets whose sequence numbers are immediately before and immediately after the sequence number of the retransmitted packet, respectively, where the TSval field values are respectively denoted by $TS_{before}$ and $TS_{after}$, and $TS_{before}$ $TS_{after}$; and then calculates an approximate TSval value, denoted by $TS_{rexmit}$, that is less than $TS_{rexmit}$, based on a squeeze theorem or another similar algorithm. The approximate TSval value makes $TS_{before} \leq TS_{xmit} \leq TS_{after}$ hold true. For example, as shown in FIG. 10, the receive end determines that $TS_{xmit}=10$, based on TSval values 10 of packets whose sequence numbers are 30 and 32.

Operation 1104. The receive end constructs an acknowledgment packet in response to the retransmitted packet according to a TCP protocol specification, where a TSecr field value of the constructed acknowledgment packet is set to the calculated approximate TSval value $TS_{xmit}$, instead of an actual transmission timestamp of the retransmitted packet. In other words, the receive end forges the timestamp of the retransmitted packet. As shown in FIG. 10, a TSecr field value in an acknowledgment packet corresponding to a retransmitted packet is set to 10. Therefore, based on the timestamp forged in the acknowledgment packet, the transmit end determines: the acknowledgment packet is in response to a packet previously determined as having been lost (the packet in FIG. 9 having a sequence number 31 and a transmission timestamp 10), the previous determining that the packet has been lost is a misjudgment, and therefore the congestion window avoidance is also unnecessary. Therefore, the transmit end compensates the congestion window size.

Operation 1105. The receive end sends the constructed acknowledgment packet to the transmit end.

Operation 1106. After receiving the acknowledgment packet constructed in S5, the transmit end deduces, based on a timestamp recorded in the TSecr field in the acknowledgment packet, that this acknowledgment packet is in response to a previously sent packet that has a same sequence number, instead of the retransmitted packet (in other words, the packet having this sequence number is not lost), and that the retransmission and congestion window avoidance that are triggered because of a determined loss of the packet having this sequence number are unnecessary; and based on this, the transmit end compensates a congestion window size and/or a slow start threshold.

In the packet transmission method provided in this embodiment of the present invention, for the retransmitted packet that has been received only once, the receive end forges a timestamp option to "deceive" the transmit end into believing that the retransmitted packet has been received repeatedly, and the transmit end further deduces that the congestion window avoidance because of previous retransmission of the packet having the sequence number is unnecessary, and based on this, compensates the congestion window size and/or the slow start threshold, achieving an effect similar to that of the packet transmission method shown in FIG. 7.

It should be noted that in the packet transmission method described in the embodiment related to FIG. 7 or FIG. 11, the operations performed by the receive end may be implemented by a terminal, a server, or a network device.

In an embodiment, functions of the transmit end described in the embodiment related to FIG. 7 or FIG. 11 are implemented by a TCP/IP protocol stack of a first application server 20, and functions of the receive end are implemented by a TCP/IP protocol stack of a terminal 110. The TCP/IP protocol stack of the terminal 110 may be executed by a proper combination of software, hardware, and/or firmware on the terminal 110. For example, in a possible implementation, the TCP/IP protocol stack may be stored in a memory in a form of an executable program. A processor of the terminal 110 runs the executable program corresponding to the TCP/IP protocol stack to perform some or all operations of the receive end described in the method embodiments. In another possible implementation, the TCP/IP protocol stack may be implemented by a hardware circuit or a dedicated chip such as a field programmable gate array (FPGA) or an application-specific integrated circuit (ASIC). For related details about performing the foregoing method operations by the TCP hardware circuit or dedicated chip, refer to the foregoing method embodiment, and details are not repeated herein.

In another embodiment, functions of the receive end described in the embodiment related to FIG. 7 or FIG. 11 are implemented by a TCP/IP protocol stack of a first application server 20, and functions of the transmit end are implemented by a TCP/IP protocol stack of a terminal 110. For related implementation details, refer to the foregoing embodiments, and details are not described again.

It can be understood that the packet transmission method described in this embodiment of the present invention may be further applied to a network device. The network device is an access point or a router, and is configured to forward a packet between the transmit end and the receive end.

Figure 12:
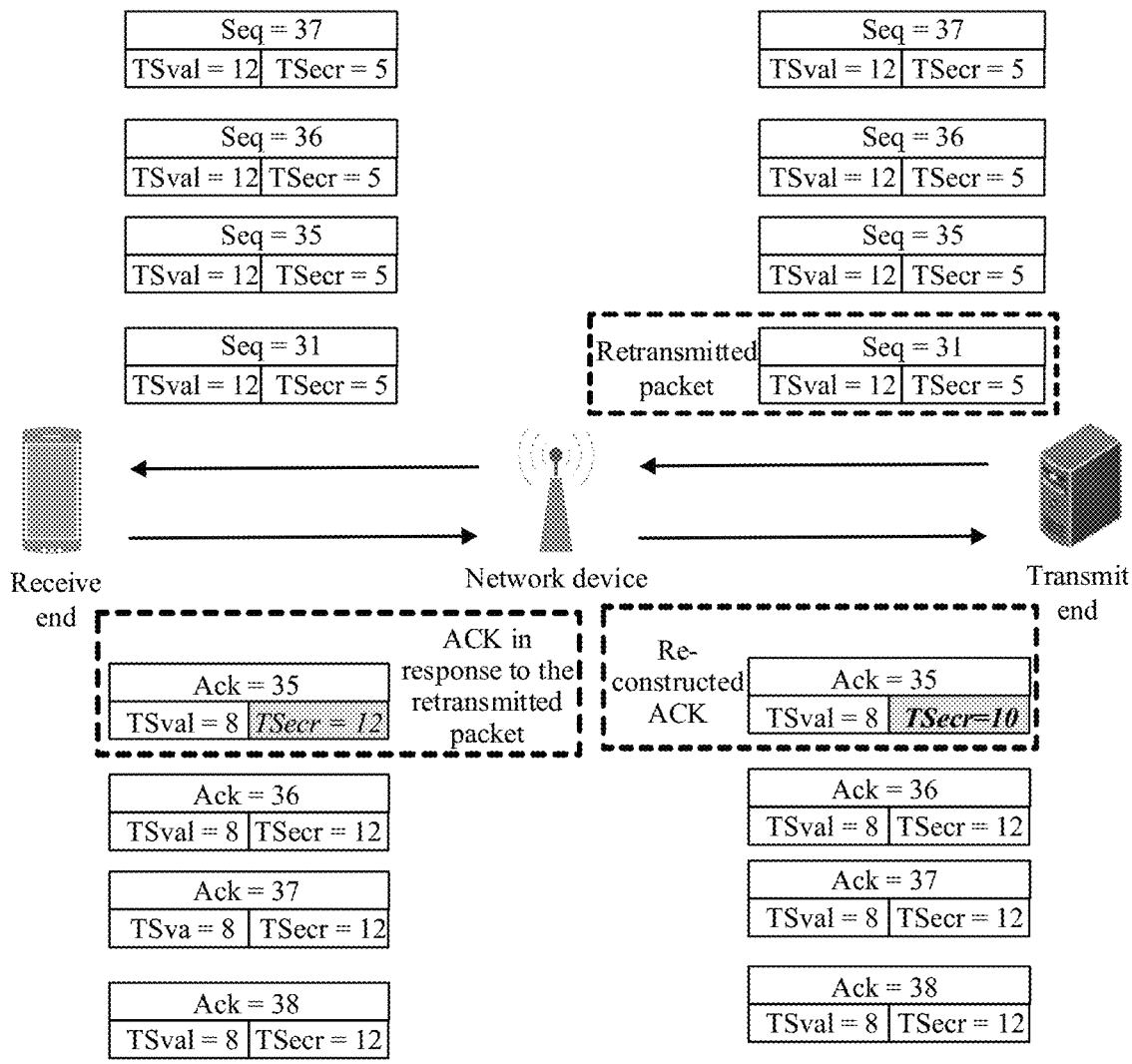
FIG. 12 is a flowchart of another packet transmission method according to an embodiment of the present invention.

As shown in FIG. 12, in a timestamp option enabled scenario, a network device forwards, to a receive end, a packet (including a retransmitted packet) sent by a transmit end, and the receive end constructs an acknowledgment packet in response to the retransmitted packet after receiving the retransmitted packet, and returns the acknowledgment packet. When the acknowledgment packet passes through the network device, the network device calculates an approximate TSval value in the manner described in operation 1103 in FIG. 11, then replaces a current TSecr value in the acknowledgment packet with the calculated approximate TSval value (as shown in FIG. 12, TSecr in an ACK in response to the retransmitted packet changes from 12 to 10), and finally, sends an updated acknowledgment packet. After receiving the updated acknowledgment packet, the transmit end compensates a congestion window size and/or a slow start threshold based on an updated TSecr field value in this acknowledgment packet. For related implementation details of calculating the approximate TSval value, refer to the embodiment related to FIG. 11, and details are not described again.

Similarly, in a SACK option enabled scenario, after a receive end returns an acknowledgment packet in response to a retransmitted packet, a network device may also use the method described in operation 705 in FIG. 7 to add a repetition indication field to the acknowledgment packet, and then forwards the acknowledgment packet to the transmit end; and the transmit end further compensates a congestion window size and/or a slow start threshold based on the repetition indication field. For related implementation details of setting the repetition indication field, refer to the embodiment related to FIG. 7, and details are not described again.

Figure 13:
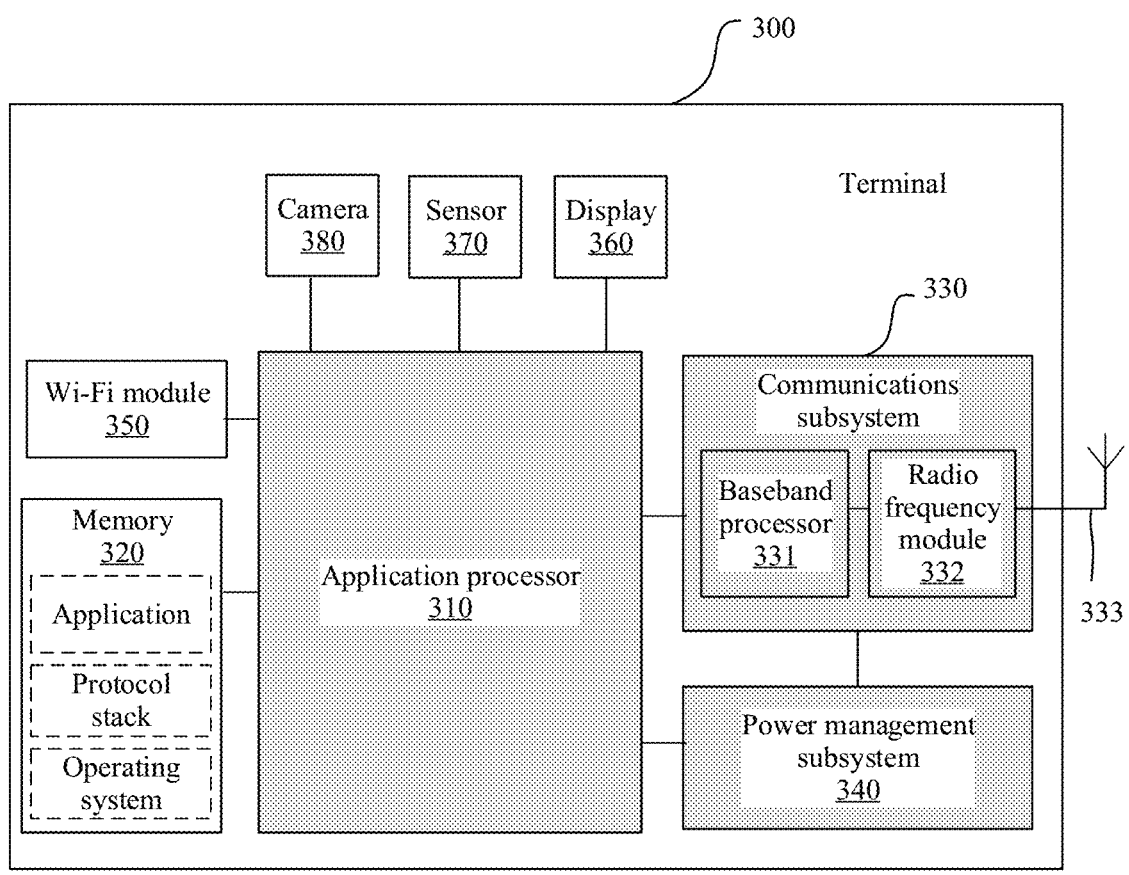
FIG. 13 is a schematic structural diagram of a terminal according to an embodiment of the present invention.

As shown in FIG. 13, an embodiment of the present invention further provides a terminal 300. According to FIG. 13, the terminal 300 includes an application processor 310, a memory 320, a communications subsystem 330, and a power management subsystem 340. The memory 320 stores an executable program. The executable program includes an operating system, a protocol stack program, and an application. The power management subsystem 340 is configured to supply power to a system, and may be specifically a power management chip.

The communications subsystem 330 is a basic communications unit of the terminal 300. In an embodiment, the communications subsystem 330 is a wireless modem (Modem), and mainly performs functions such as baseband processing, modulation, demodulation, signal amplification and filtering, and balancing. The communications subsystem 330 includes a baseband processor 331, a radio frequency module 332, and an antenna 333. The baseband processor 331 and the application processor 310 may be integrated into one chip. In another embodiment, the baseband processor 331 and the application processor 310 may be deployed separately: The baseband processor 331 and the application processor 310 act as two separate chips to exchange information in an inter-core communication mode. In this separate deployment manner, the baseband processor 331 is equivalent to a peripheral of the application processor 310. The two processors require respective independent external memories and respective independent software upgrade interfaces.

The radio frequency module 332 is mainly responsible for signal sending and receiving. The baseband processor 331 is responsible for signal processing, for example, A/D or D/A conversion of a signal, signal coding and decoding, and channel coding and decoding. The baseband processor 331 supports one or more of wireless communications standards. The wireless communications standards herein include but are not limited to GSM, CDMA 1x, CDMA2000, WCDMA, HSPA, LTE, and the like. In an embodiment, the radio frequency module 332 includes radio frequency circuits that perform functions such as radio frequency receiving and sending, frequency synthesis, and power amplification. The radio frequency circuits may be packaged in a radio frequency chip. In another embodiment, some or all of the radio frequency circuits included in the radio frequency module 332 and the baseband processor 331 are jointly integrated into a baseband chip.

The memory 320 usually includes a memory and an external storage device. The memory may be a random access memory (RAM), a read-only memory (ROM), a high-speed cache (CACHE), or the like. The external storage device may be a hard disk, an optical disk, a USB disk, a floppy disk, a tape drive, or the like. The executable program is usually stored in the external storage device. The application processor 310 loads the executable program to the memory from the external storage device, and then executes the program.

Optionally, the terminal 300 further includes a Wireless Fidelity (Wi-Fi) module 350. The Wi-Fi module 350 supports the IEEE 802.11 protocol series. The terminal 300 may connect to a wireless local area network (WLAN) by using the Wi-Fi module 350. In an embodiment, the Wi-Fi module 350 may be a Wi-Fi chip, and communicates with the application processor 310 by using a bus. In another embodiment, the Wi-Fi module 350 may be integrated into the communications subsystem 330, for example, the baseband processor 331.

It can be understood that the communications subsystem 330 and the Wi-Fi module 350 are both configured to receive data from the outside or send data of the terminal 300 to an external device. The terminal 300 usually includes both the communications subsystem 330 and the Wi-Fi module 350, to support both cellular network access and WLAN access. However, considering costs or another factor, alternatively, the terminal 300 may include only one of the communications subsystem 330 and the Wi-Fi module 350.

Optionally, the terminal 300 further includes a display 360 configured to display information entered by a user or information provided for a user, various menu interfaces of the terminal 300, and the like. The display 360 may be a liquid crystal display (LED), an organic light-emitting diode (OLED), or the like. In some other embodiments, a touch panel may cover the display 360 to form a touch display screen.

In addition, the terminal 300 may further include a camera 380 configured to take photos or shoot videos and one or more sensors 370 such as a gravity sensor, an acceleration sensor, or an optical sensor.

In addition, persons skilled in the art may understand that the terminal 300 may include fewer or more components than those shown in FIG. 13. The terminal shown in FIG. 13 includes only components more related to the plurality of implementations disclosed in the embodiments in the specification.

Specifically, as shown in FIG. 13, the executable program stored in the memory 320 includes an operating system, a protocol stack program, and an application. In some scenarios, the protocol stack program is an independent executable program. The operating system calls a protocol stack by using an interface, for packet processing. In some scenarios, the protocol stack program may alternatively be included in the operating system to act as a part of an operating system kernel. The protocol stack program may be classified into a plurality of modules according to protocol layers or functions. Each module implements functions of one protocol layer. For example, a network-layer module is configured to implement a network-layer protocol (for example, the IP protocol), and the transport-layer module is configured to implement a transport-layer protocol (for example, the TCP protocol or the UDP protocol). After the communications subsystem 330 or the Wi-Fi module 350 receives a packet, a hardware driver of the terminal 300 adds the packet to a buffer queue, and notifies an operating system; and the operating system schedules all modules of the protocol stack by using system call interfaces, to perform the working process described in the embodiment related to FIG. 7 or FIG. 11.

It should be noted that the term "executable program" used in this embodiment of the present invention should be widely explained as including but not being limited to an instruction, an instruction set, code, a code segment, a subprogram, a software module, an application, a software package, a thread, a process, a function, firmware, middleware, or the like.

Figure 14:
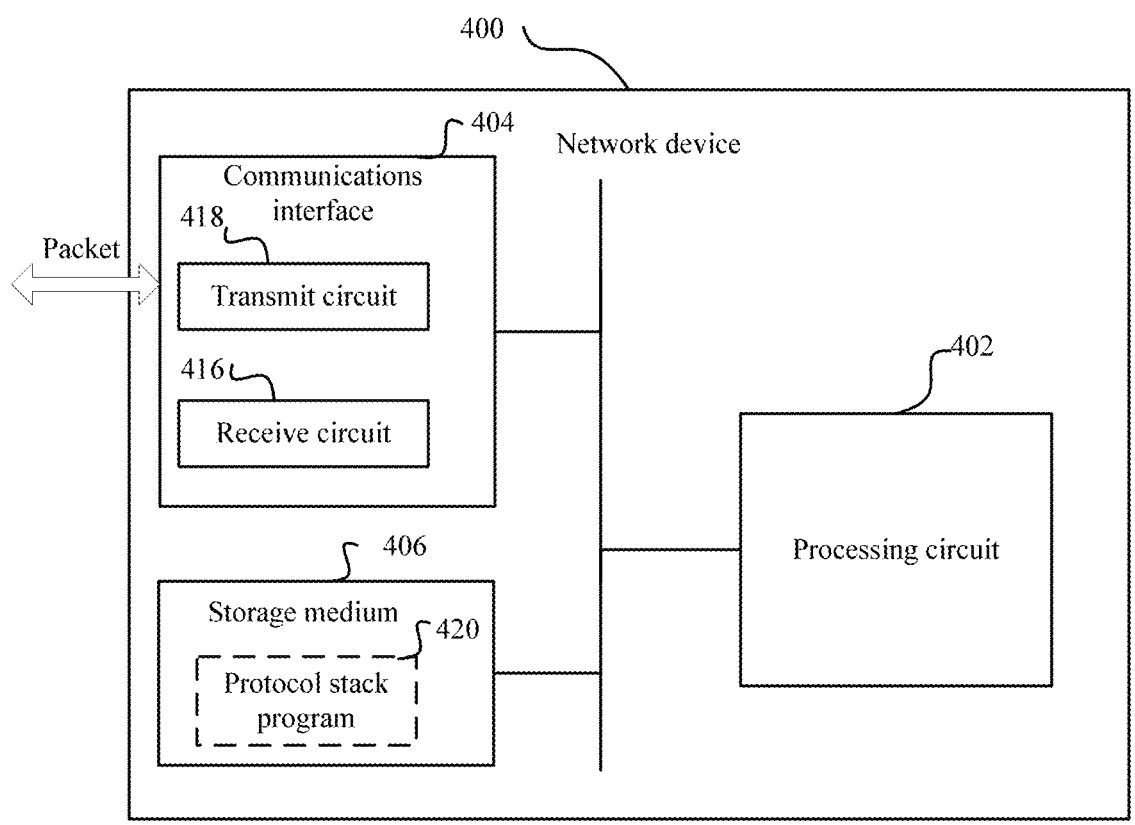
FIG. 14 is a schematic structural diagram of a network device according to an embodiment of the present invention.

An embodiment of the present invention provides a network device 400. As shown in FIG. 14, the network device 400 includes a processing circuit 402, and a communications interface 404 and a storage medium 406 that are connected to the processing circuit 402.

The processing circuit 402 is configured to: process data, control data access and storage, send a command, and control another component to perform an operation. The processing circuit 402 may be implemented as one or more processors, one or more controllers, and/or another structure that can be configured to execute a program. The processing circuit 402 may specifically include at least one of a general purpose processor, a digital signal processor (DSP), an application-specific integrated circuit (ASIC), and a field programmable gate array (FPGA) or another programmable logical component. The general purpose processor may include a microprocessor and any conventional processor, controller, microprocessor, or state machine. The processing circuit 302 may be implemented as a computing component such as a combination of a DSP and a microprocessor.

The storage medium 406 may include a computer readable storage medium, such as a magnetic storage device (for example, a hard disk, a floppy disk, or a magnetic stripe card), an optical storage medium (for example, a digital versatile disc (DVD)), a smart card, a flash memory device, a random access memory (RAM), a read-only memory (ROM), a programmable ROM (PROM), an erasable PROM (EPROM), a register, or any combination thereof. The storage medium 406 may be coupled to the processing circuit 402, so that the processing circuit 402 can read information and write information into the storage medium 406. Specifically, the storage medium 406 may be integrated into the processing circuit 402. Alternatively, the storage medium 406 and the processing circuit 302 may be separate.

The communications interface 404 may include a circuit and/or a program to implement bidirectional communication with the terminal 400 and one or more wireless network devices (such as a router, a switch, or an access point). The communications interface 404 includes at least one receive circuit 416 and/or at least one transmit circuit 418. In an embodiment, an entire communications interface 404 or a part of the communications interface 404 may be implemented by a wireless modem.

In an embodiment, the storage medium 406 stores a protocol stack program 420. The processing circuit 402 is adapted to execute a protocol stack program 420 stored in the storage medium 406, to implement functions of a protocol stack. The protocol stack specifically implements some or all operations in the embodiment related to FIG. 7 or FIG. 11.

Figure 15:
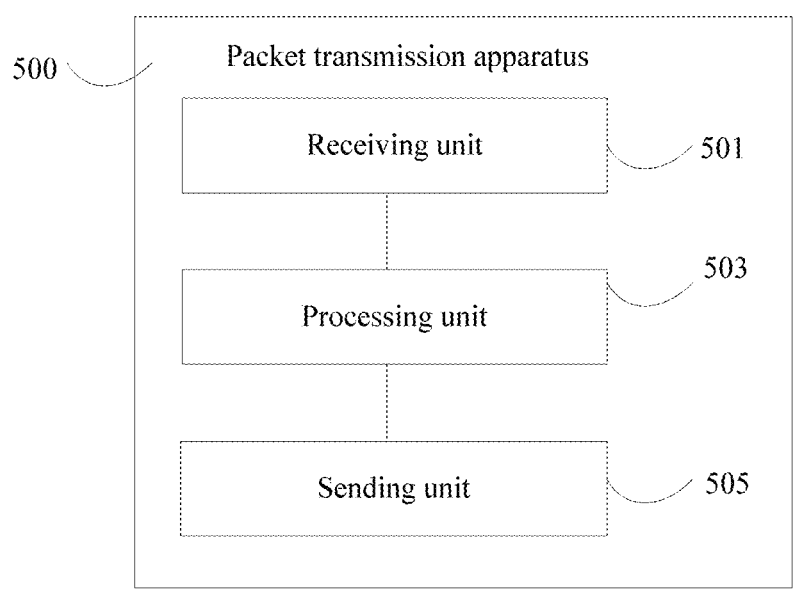
FIG. 15 is a schematic diagram of a packet transmission apparatus according to an embodiment of the present invention.

Based on the packet transmission method described in the foregoing embodiments, an embodiment of the present invention further provides a packet transmission apparatus 500. As shown in FIG. 15, the packet transmission apparatus 500 includes a receiving unit 501, a processing unit 503, and a sending unit 505. The receiving unit 501 is configured to receive a retransmitted packet from a transmit end. The retransmitted packet is retransmitted by the transmit end after the transmit end determines that a sent first packet has been lost, and the receiving unit receives the retransmitted packet for the first time. The processing unit 503 is configured to construct a first acknowledgment packet in response to the retransmitted packet. The first acknowledgment packet includes a repetition indication field, to indicate that the first packet has been received repeatedly and trigger the transmit end to increase a congestion window size and/or a slow start threshold. The sending unit 505 is configured to send the acknowledgment packet constructed by the processing unit 503 to the transmit end. For implementation details about constructing the first acknowledgment packet by the processing unit 503 and sending the acknowledgment packet by the sending unit 505, refer to the method embodiment related to FIG. 7 or FIG. 11, and details are not described again.

The packet transmission method and device provided in the embodiments of the present invention have been described in detail. The principle and embodiments of the present invention have been described herein using specific examples. The descriptions of the embodiments of the present invention are merely intended to help understand the method and the core idea of the present invention. In addition, persons of ordinary skill in the art can make variations and modifications to embodiments of the present invention in terms of specific implementations and the application scope based on the ideas of the present disclosure. Therefore, the content of this specification shall not be construed as to limit the present invention.

What is claimed is:

1. A packet transmission method, comprising:
   receiving, by a terminal, a retransmitted packet, wherein the retransmitted packet is sent by a server in response to determining that a sent first packet has been lost, wherein a sequence number of the retransmitted packet is the same as a sequence number carried in the first packet; and
   upon receiving the retransmitted packet for the first time, sending, by the terminal to the server, a first acknowledgment packet to respond to the retransmitted packet received for the first time, wherein the first acknowledgment packet comprises a repetition indication field for triggering the server to increase at least one of a congestion window size or a slow start threshold.

2. The method according to claim 1, wherein the repetition indication field comprised in the first acknowledgment packet is forged by the terminal for deceiving the server that the first packet has been received repeatedly.

3. The method according to claim 1, wherein the first acknowledgment packet further comprises a selective acknowledgement (SACK) option, and the SACK option indicates sequence number information of a packet that has been received by the terminal.

4. The method according to claim 3, wherein the repetition indication field comprises the sequence number of the first packet, and the repetition indication field is located in a first block of the SACK option in the first acknowledgment packet.

5. The method according to claim 3, wherein the repetition indication field comprises the sequence number of the first packet, the repetition indication field is located in a duplicate SACK (DSACK) block, and the DSACK block is used to report a packet repeatedly received by the terminal to the server.

6. The method according to claim 1, further comprising: establishing, by the terminal, a TCP connection to the server by using a wireless network, wherein the wireless network comprises at least one access point.

7. A terminal, comprising a memory storing a protocol stack program, a communications subsystem, and an application processor:
   wherein the communications subsystem is configured to receive a retransmitted packet, wherein the retransmitted packet is sent by a server in response to determining that a sent first packet has been lost, wherein a sequence number of the retransmitted packet is the same as a sequence number carried in the first packet;
   wherein the application processor is configured to run the protocol stack program in the memory to perform the following operations:
   constructing a first acknowledgment packet to respond to the retransmitted packet received by the communications subsystem for the first time, wherein the first acknowledgment packet comprises a repetition indication field for triggering the server to increase at least one of a congestion window size or a slow start threshold;

wherein the communications subsystem is further configured to send the constructed first acknowledgment packet.

8. The terminal according to claim 7, wherein the repetition indication field comprised in the first acknowledgment packet is forged by the application processor for deceiving the server that the first packet has been received repeatedly.

9. The terminal according to claim 7, wherein the first acknowledgment packet further comprises a selective acknowledgement (SACK) option, the SACK option to indicate sequence number information of a packet that has been received by the terminal.

10. The terminal according to claim 9, wherein the repetition indication field comprises the sequence number of the first packet, and the repetition indication field is located in a first block of the SACK option in the first acknowledgment packet.

11. The terminal according to claim 7, wherein the terminal is configured to connect to a wireless network and to establish a TCP connection to the server, by using at least one access point.

12. A network device, configured to forward a packet between a transmit end and a receive end, comprising:
a communications interface configured to:
receive a retransmitted packet sent by the transmit end to the receive end;
forward the retransmitted packet to the receive end; and
receive a first acknowledgment packet of the receive end in response to the retransmitted packet, wherein the retransmitted packet is sent by the transmit end after the transmit end determines that a sent first packet has been lost, wherein a sequence number of the retransmitted packet is the same as a sequence number of the first packet, wherein the first acknowledgment packet is sent by the receive end when the receive end receives the retransmitted packet for the first time;
a storage medium configured to store a protocol stack program; and
a processing circuit configured to execute the protocol stack program stored in the storage medium to add a repetition indication field to the first acknowledgment packet to obtain a second acknowledgment packet, wherein the repetition indication field is used to trigger the transmit end to increase at least one of a congestion window size or a slow start threshold;
the communications interface is further configured to send the second acknowledgment packet.

13. The network device according to claim 12, wherein the repetition indication field comprised in the first acknowledgment packet is forged by the processing circuit for deceiving the server that the first packet has been received repeatedly.

14. The network device according to claim 12, wherein the first acknowledgment packet and the second acknowledgment packet further comprise a SACK option, and the SACK option indicates sequence number information of a packet that has been received by the receive end.

15. The network device according to claim 14, wherein the repetition indication field comprises the sequence number of the first packet, and the repetition indication field is located in a first block of the SACK option in the second acknowledgment packet.

16. The network device according to claim 14, wherein the network device is an access point, and the receive end is configured to connect to a wireless network and to establish a TCP connection to the transmit end by using the network device.

* * * * *